Oct. 8, 1963 S. C. ROCKAFELLOW 3,106,682
CURRENT PEAKED PULSE GENERATOR PROVIDING SWITCHED
D.C. POTENTIAL OF A CHARGED CAPACITOR
THROUGH AN RLC CIRCUIT
Filed Aug. 1, 1960

INVENTOR.
STUART C. ROCKAFELLOW
BY
Woodhams Blanchard and Flynn
ATTORNEYS

United States Patent Office 3,106,682
Patented Oct. 8, 1963

3,106,682
CURRENT PEAKED PULSE GENERATOR PROVIDING SWITCHED D.C. POTENTIAL OF A CHARGED CAPACITOR THROUGH AN RLC CIRCUIT
Stuart C. Rockafellow, Plymouth, Mich., assignor to Robotron Corporation, Detroit, Mich., a corporation of Michigan
Filed Aug. 1, 1960, Ser. No. 46,846
5 Claims. (Cl. 328—76)

This invention relates to an electrical circuit for supplying electrical current to a load and, more particularly, relates to an improved circuit for supplying a load with high amperage, short duration pulses of alternating polarity from an alternating potential source. This application is a continuation-in-part of application Serial No. 22,822, filed April 18, 1960, now abandoned, which in turn is a continuation-in-part of application Serial No. 842,451, filed September 25, 1959, now abandoned, which in turn is a continuation-in-part of application Serial No. 763,725, filed September 26, 1958, now abandoned. Application Serial No. 22,822 has been replaced by continuation-in-part application Serial No. 242,577, filed November 30, 1962.

In the first-mentioned copending application, there is disclosed a circuit for supplying current in form of short duration, high amperage pulses of alternating polarity, particularly intended for supplying current to the primary winding of a welding transformer. The reasons for and the advantages of this system are described in detail in the first-mentioned application and reference should be made thereto for a more complete statement thereof.

The system disclosed in the first-mentioned application employs a single capacitor which operates in connection with switch means, such as two back-to-back connected ignitrons, in such a fashion that the capacitor is discharged from a previously charged condition and is then charged in the opposite polarity during each half-cycle of the alternating potential source, all of which occurs in a very short time, such as one millisecond. While this system is highly satisfactory and effective in operation, on occasion this circuit creates very large transients in the line voltage due to the fact that the full load of the circuit is impressed on the line for only short periods of time.

In order to eliminate or at least minimize this problem, it has been found to be advantageous to use two additional capacitors, each associated with one of the switch means and arranged in such fashion that each capacitor is charged for a portion of one half-cycle of the alternating potential source and is then at least partially discharged on the following half-cycle. These two additional capacitors supply energy to the aforementioned pulse-supplying circuit. Desirably, the two additional capacitors are several times as large as the capacitor in the pulse-supplying circuit. The two capacitors are charged and partially discharged on alternate half-cycles and each capacitor is charged in only one polarity. Thus, each capacitor is charged for a relatively long time period, such as four milliseconds, and disturbances in the line voltage are thereby eliminated or at least minimized.

The present invention arose particularly in connection with the welding industry and, for illustrative purposes, the following description will proceed primarily with reference thereto. However, it will be understood that the invention is also useful for other purposes, such as for electroplating and induction heating, and the scope of the invention shall be construed accordingly.

Accordingly, it is an object of this invention to provide an improved circuit for transmitting short, spaced, high amperage pulses of alternating polarity to a load, particularly to welding electrodes.

It is a further object of this invention to provide an improved circuit, as aforesaid, which utilizes two capacitors which are alternately charged during predetermined portions of the respective half-cycles of the alternating potential source and are discharged during the half-cycle following that in which they are respectively charged to supply energy to a series connected resistance, capacitance and inductance pulse-supplying circuit.

It is a further object of this invention to provide an improved circuit, as aforesaid, which retains substantially all of the advantages of the system disclosed in application Serial No. 22,822 and eliminates certain of the disadvantages encountered in the use of the specific circuit set forth therein.

It is a further object of this invention to provide an improved circuit, as aforesaid, which eliminates sudden application of full load of the circuit on the line source so that the line voltage will not be detrimentally affected by turning on the circuit to which the invention relates.

It is a further object of this invention to provide an improved circuit, as aforesaid, in which the pulse-supplying circuit is so connected to the line voltage source as to not create substantial transients or other disturbances in the line voltage when pulses are supplied to the load.

It is a further object of this invention to provide an improved circuit, as aforesaid, in which energy for the pulses is drawn from the line voltage source over an extended period of time, such as about four milliseconds, rather than being suddenly drawn therefrom, such as in about one millisecond.

Other objects and purposes of the invention will become apparent to those acquainted with circuits of this type upon reading the following disclosure and inspecting the accompanying drawing in which.

General Description

Figure 1:
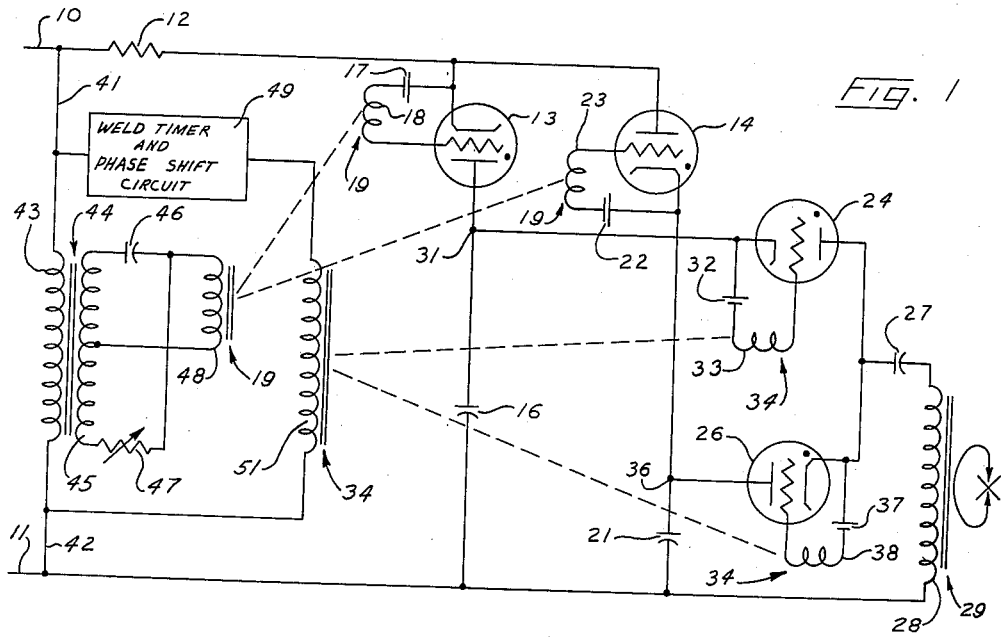
FIGURE 1 is a circuit diagram illustrating the circuit to which the invention relates.

In general, the invention provides an electrical circuit including a source of alternating potential and a transformer having a primary winding and having a secondary winding connected to a load. A pair of back-to-back connected electrical switches, such as thyratrons, which are conductive on opposite half-cycles of the source, are connected in series with a capacitor and with the primary winding of the transformer. The capacitor performs a critical function in the pulse-supplying operation and, particularly, makes the voltage applied to the primary winding substantially greater than the line voltage as is discussed in detail in application Serial No. 22,822. Reference should be made to said application for a full description of the function of this capacitor. The switches are also connected, respectively, to a pair of circuits for supplying electrical energy thereto. Each of the latter circuits includes a rectifier, which is preferably a gas-filled triode, and a capacitor in series therewith. The rectifiers are oppositely sensed so that the capacitors are charged during opposite half-cycles of the alternating potential source. Phase shift means are provided for controlling the point on the supply wave at which the rectifiers become conductive and thereby adjusting the amount of charge in the capacitors. Means are provided to turn on the back-to-back connected switches on opposite half-cycles of the source and the switches are so arranged with respect to the rectifiers that the capacitors are respectively charged on one half-cycle of the source and are discharged through the electric switch associated therewith on the following half-cycle of the source.

*Detailed Description*

Referring to the drawings, the circuit includes a pair of line conductors 10 and 11 connected to a source of alternating potential. Line conductor 10 is connected through an inductance or a resistance, here a resistance 12, to the cathode of rectifier 13 and to the anode of rectifier 14, which rectifiers are here shown as being thyratrons. The resistance 12, or an inductance used in place thereof, insures that the hereinafter described capacitors 16 and 21 charge over a portion of the respective half-cycles of the A.C. source rather than charging substantially instantaneously. The rectifiers 13 and 14 can be of the solid state type, such as copper oxide rectifiers, but in such case the phase shifting of the rectifiers described hereinbelow cannot be provided and the advantages which result therefrom cannot be obtained.

The anode of rectifier 13 is connected through a capacitor 16 to the line conductor 11. A suitable biasing means, such as a battery 17, is connected in series with a secondary winding 18 of a transformer 19 between the cathode and the control electrode of the rectifier 13. Thus, when the transformer 19 is not energized, the control electrode is negative with respect to the cathode and the rectifier 13 is not conductive. However, when the transformer 19 is energized, a positive potential overcoming the negative potential from battery 17 is applied to the control electrode of rectifier 13 so that it can conduct.

The cathode of rectifier 14 is connected through a capacitor 21 to the line conductor 11. The rectifier 14 is normally biased off by a biasing source, such as a battery 22, which is connected in series with another secondary winding 23 of the transformer 19. Thus, rectifier 14 is normally nonconductive but can be made conductive when transformer 19 is energized. The secondary windings 18 and 23 of said transformer are arranged in such polarity that the rectifiers 13 and 14 can be made conductive on opposite half-cycles of the alternating potential source.

A pair of switches, here shown as thyratrons 24 and 26, are connected in back-to-back relationship with the anode of one thyratron 26 and the cathode of the other thyratron 24 connected through a capacitor 27 to one end of the primary winding 28 of the welding transformer 29. The other end of the primary winding 28 is connected to the line conductor 11. The secondary winding of the transformer 29 is connected to the welding electrodes in a conventional manner.

The capacitors 16 and 21 desirably have a capacity several times as large as that of capacitor 27. For example, in one commercial embodiment of the disclosed circuit, the capacitor 27 is 300 mfd. and the capacitors 16 and 21 are each 10,000 mfd. Under such circumstances, the capacitors 16 and 21 are only partially discharged when the thyratrons 24 and 26 with which they are respectively associated are conductive. For example, they may be partially discharged to form a charged condition wherein the voltage thereacross is 300 v. to a partially discharged condition where the voltage thereacross is 250 v.

The cathode of thyratron 24 is connected to a junction point 31 between the rectifier 13 and the capacitor 16. The thyratron 24 is maintained normally nonconductive by means of a biasing source, such as a battery 32, connected in series with the secondary winding 33 of a transformer 34 between the cathode and control electrode of said thyratron. Thus, the battery 32 maintains the thyratron 24 normally nonconductive until the negative potential thereof is overcome by a positive potential supplied by energization of the transformer 34.

The anode of thyratron 26 is connected to a junction point 36 between rectifier 14 and capacitor 21. The thyratron 26 is normally maintained nonconductive by a biasing means, such as a battery 37, connected in series with another secondary winding 38 of the transformer 34 between the cathode and control electrode of said thyratron. The secondary windings 33 and 38 of transformer 34 are connected so that the thyratrons 24 and 26 can be rendered conductive on opposite half-cycles of the alternating potential source.

The biasing batteries 17, 22, 32 and 37 can be replaced by any suitable circuits for supplying a substantially constant negative potential on the control electrodes of rectifiers 13 and 14 and thyratrons 24 and 26, respectively.

Potential for energizing the transformer 19 and the transformer 34 is supplied by conductors 41 and 42 which are connected, respectively, to the line conductors 10 and 11. A primary winding 43 of a transformer 44 is connected at its ends to the conductors 41 and 42. The secondary winding 45 of transformer 44 has a capacitor 46 connected to one end thereof and an adjustable resistance 47 connected to the other end thereof. The capacitor 46 and the resistor 47 are both connected to one end of the primary winding 48 of transformer 19 and the other end of said primary winding is connected to a center tap on the secondary winding 45. The circuit including winding 45, capacitor 46, resistance 47 and winding 48 defines a conventional resistance-capacitance phase-shift network which causes energization of the transformer 19 at a selected point in the wave form of the alternating potential source depending on the setting of the resistor 47. When the transformer 19 is energized, the rectifiers 13 and 14 will be rendered conductive at selected times, respectively, during opposite half-cycles of the alternating potential source. This will result in charging of the capacitors 16 and 21 during the remainder of each of such half-cycles.

The conductors 41 and 42 are connected through a suitable control circuit 49, here diagrammatically shown as a weld-timing and phase-shift circuit, to the primary winding 51 of the transformer 34. The weld-timing and phase-shift circuit 49 may be of any suitable type and will cause energization of the transformer 34 when it is desired to have weld current flow. When transformer 34 is energized, the tubes 24 and 26 will be rendered conductive on opposite half-cycles of the alternating potential source. Thus, weld current will be permitted to flow at selected points during the respective half-cycles of the alternating potential source depending upon the setting of the phase-shift portion of the circuit 49.

It should be noted that the above-described circuit is intended for use where the parameters are selected so that a constant denoted as K is between 1 and 2, preferably between 1.33–1.7 based on equivalent circuit values. The value of K is determined from the formula $$K = 1 + e^{-\frac{\pi}{2}R\sqrt{\frac{C}{L}}}$$

where R, L and C are the quivalent circuit values of the resistance, inductance and capacitance of the portion of the above-described circuit including switches 24 and 26, capacitor 27 and winding 28. This is discussed in greater detail in my afore-mentioned application Serial No. 22,822 and reference should be made thereto for a more complete statement thereof.

*Operation*

While the operation of the circuit has been indicated somewhat above and will be readily understood by persons skilled in the art, it will be further described in order to insure a complete understanding of the invention.

Figure 2:
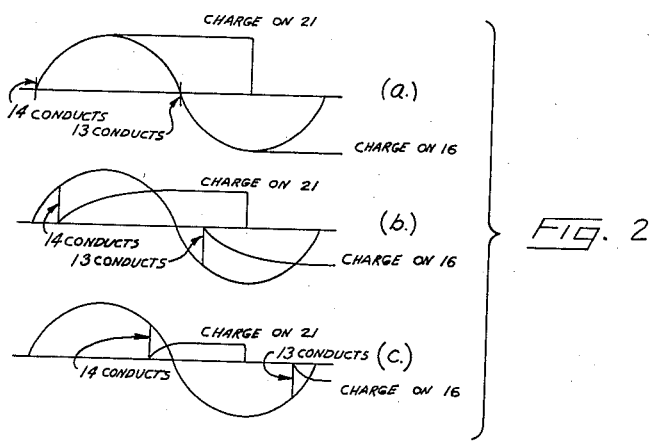
FIGURE 2 is a time vs. voltage diagram illustrating the various levels to which the capacitors are charged depending upon the phase shift of the charging circuits therefor.

Alternating potential applied to the conductors 10 and 11 is supplied to the rectifiers 13 and 14. The rectifiers 13 and 14 are normally maintained nonconductive by the batteries 17 and 22 but energization of the transformer 19 by the phase-shift circuit including capacitor 46 and adjustable resistance 47 will effect conduction of said rectifiers alternately at a selected time during the respective half-cycles of the source. Thus, when the rectifier 13 is conductive capacitor 16 will charge and when rectifier 14 is conductive capacitor 21 will charge. It will be noted that the capacitors 16 and 21 are charged on opposite half-cycles of the alternating potential source. If maximum charging of the capacitors 16 and 21 is desired, the resistance 47 is adjusted to give no phase-shift so that the transformer 19 is energized at the beginning of the respective half-cycles of the source and the rectifiers 13 and 14 are conductive during the entirety of the respective half-cycles. Under these conditions the capacitors 16 and 21 will be charged to a voltage equal to the line voltage. This is indicated in FIGURE 2(a). If a lesser charge on capacitors 16 and 21 is desired, the resistance 47 is adjusted to cause conduction of the rectifiers 13 and 14 at selected times after the beginning of the respective half-cycles. As shown in FIGURE 2(b) and (c), the later the time the rectifiers 13 and 14 are rendered conductive in the cycle of the alternating source, the less will be the charge on the capacitors 16 and 21. The capacitors 16 and 21 are discharged during the half-cycle following that in which they are charged as described hereinbelow.

The thyratrons 24 and 26 are normally nonconductive. However, upon energization of the transformer 34, the thyratrons become conductive and permit partial discharging of capacitors 16 and 21, respectively, therethrough. The thyratrons 24 and 26 will become conductive respectively on opposite half-cycles of the alternating potential source. Energization of the transformer 34 is controlled by the weld timer and phase-shift circuit 49 in a conventional manner so that the transformer winding 51 will be energized at the end of the squeeze period of the welding sequence to permit flow of welding current.

When the thyratron 24 is conductive, capacitor 16 will partially discharge therethrough and through capacitor 27, thence through the primary winding 28 of the welding transformer 29. Similarly, when thyratron 26 is conductive, capacitor 21 will partially discharge therethrough, thence through capacitor 27, and primary winding 28 back to the line conductor 11. Since the capacitors 16 and 21 are oppositely charged and the thyratrons are conductive on opposite half-cycles, a pulse will be applied to the primary winding 28 during each half-cycle and the pulses will be of alternating polarity.

As pointed out in the first-mentioned application, the presence of the capacitor 27 in series with the thyratrons 24 and 26 and with the primary winding 28 of the welding transformer gives a supply of high amperage, short duration pulses of alternating polarity through the primary winding 28. The voltage developed in the primary winding 28 will be substantially in excess of the line voltage and the charge on capacitors 16 and 21 and, thus, large quantities of energy can be supplied to the welding transformer in a very short period of time.

The capacitors 16 and 21 in effect supply voltage for operation of the pulse supplying circuit comprising thyratrons 24 and 26, capacitor 27 and winding 28 and serve to minimize the effect on the line voltage of the firing of the thyratrons 24 and 26. This prevents or minimizes the occurrence of substantial transients in the line voltage.

The resistance or inductance 12 insures that the capacitors 16 and 21 can be charged by the line voltage for a substantial period of time, such as four milliseconds. This is much greater than would be the case if the capacitor 27 were to be directly charged by line voltage in the manner described in the parent application, which often takes place in one millisecond or less. This substantially minimizes or eliminates any disturbance therein in the line voltage at the times when pulses are being supplied to the load.

While the disclosed circuit employs thyratrons as switching tubes, it will be apparent that the invention is adapted for use where ignitrons are utilized as switching tubes to control flow of pulses to the welding transformer. In such a case, the conduction of the ignitrons would be controlled by thyratrons whose conduction in turn would be controlled by operation of a transformer corresponding to transformer 34 hereof.

While a particular preferred embodiment of the invention has been described hereinabove, the invention contemplates such changes or modifications therein as lie within the scope of the appended claims.

What is claimed is:

1. A circuit for supplying pulses of current to a load, comprising: a source of alternating potential; a transformer having a primary winding and having a secondary winding connected to a load; two circuits connected in parallel with each other and to said source, each circuit including a rectifier and a capacitor connected in series, said rectifiers being oppositely sensed so that said capacitors are charged during alternate half-cycles of said source; a pair of electric switches, each associated with one of said circuits so as to permit discharging of each capacitor when the switch associated therewith is conductive, each switch being connected between one side of its associated capacitor and one end of said primary winding, the other side of its associated capacitor being connected to the other end of said primary winding; means for making said switches conductive during opposite half-cycles of said source; and a further capacitor connected in series with both said switches and with said primary winding of said transformer.

2. In a circuit for supplying pulses of current to a load which includes a source of alternating potential, a transformer having a primary winding and having a secondary winding connected to the load; a pair of back-to-back connected electric switches which are conductive on opposite half-cycles of said source and a capacitor connected in series between said switches and one end of said primary winding, the improvement which comprises circuitry for supplying electrical energy to said switches which comprises a pair of circuits each connected, respectively, to one of said switches for supplying electrical energy thereto, said circuits being connected to said source and each including a rectifier and a capacitor in series therewith, said rectifiers being oppositely sensed so that said capacitors are charged during opposite half-cycles of said source, each of said rectifiers also being sensed with respect to the electric switch associated therewith so that said capacitors are charged on one half-cycle of said source and are discharged through the electric switch associated therewith on the following half-cycle of said source, one side of each capacitor being connected to its associated switch and the other side of each capacitor being connected to said other end of said primary winding.

3. A circuit for supplying pulses of current to a load, comprising: a source of alternating potential; a transformer having a primary winding and having a secondary winding connected to the load; a pair of circuits connected to said source, said circuits each including a rectifier having a control electrode for controlling the conductivity thereof and a capacitor connected in series with said rectifier, said rectifiers being oppositely sensed so that said capacitors are charged on opposite half-cycles of said source; phase-shift means connected to said control electrodes for controlling the conductivity of said rectifiers and thereby controlling the time the rectifiers are conductive to thereby determine the magnitude of charge on said capacitors; a pair of electric switches, each of said switches being connected to one of said circuits at a point located between the rectifier and the capacitor thereof, said switches being connected in back-to-back relationship to one end of said primary winding, the side of each capacitor opposite that which is connected to said switch being connected to the other end of said primary winding, said switches being sensed with respect to said rectifiers so that said switches respectively will permit discharge of the capacitor associated therewith on the half-cycle following that during which the capacitor is charged; means for rendering said switches conductive during opposite half-cycles of said source; and a capacitor connected in series with said switches and said primary winding.

4. A circuit for supplying pulses of current to a load, comprising: a source of alternating potential; a transformer having a primary winding and having a secondary winding connected to the load; a pair of circuits connected to said source, said circuits each including a rectifier and a capacitor connected in series, said rectifiers being oppositely sensed so that said capacitors are charged on opposite half-cycles of said source; a pair of electric switches and means for rendering said switches conductive on alternate half-cycles of said source; a further capacitor and means connecting said further capacitor in series between said switches and said primary winding; means including one of said switches connecting the capacitor of each of said circuits across said primary winding whereby when its associated switch is conductive energy stored in said last-named capacitor will be supplied to said primary winding.

5. A circuit according to claim 4, in which the capacitor in each of said circuits is several times as large as said further capacitor whereby said capacitors in said circuits are only partially discharged when their associated switches are conductive.

References Cited in the file of this patent

UNITED STATES PATENTS

| | | |
|---|---|---|
| 2,256,209 | Levoy | Sept. 16, 1941 |
| 2,389,351 | Faulk | Nov. 20, 1945 |
| 2,442,609 | Levoy | June 1, 1948 |
| 2,660,670 | Elliot | Nov. 24, 1953 |
| 2,768,289 | Thomsen | Oct. 23, 1956 |
| 2,838,665 | Le Poole | June 10, 1958 |
| 2,841,239 | Hall et al. | July 1, 1958 |

OTHER REFERENCES

Reference Data for Radio Engineers, 1956, by International Telephone and Telegraph Corp.